United States Patent [19]
Ross

[11] Patent Number: 5,171,036
[45] Date of Patent: Dec. 15, 1992

[54] REBOUND STRAP

[75] Inventor: Joseph M. Ross, North Canton, Ohio

[73] Assignee: The Boler Company, Itasca, Ill.

[21] Appl. No.: 750,656

[22] Filed: Aug. 27, 1991

[51] Int. Cl.⁵ .............................................. B60G 11/62
[52] U.S. Cl. ..................................... 280/713; 280/715
[58] Field of Search ............... 280/688, 713, 697, 715; 267/35, 73, 74, 219

[56] References Cited

U.S. PATENT DOCUMENTS

| | | | |
|---|---|---|---|
| 1,579,183 | 3/1926 | Weiland | 267/35 |
| 2,771,291 | 11/1956 | Webb et al. | 267/73 |
| 3,228,481 | 1/1966 | Eldred | 267/69 |
| 4,162,090 | 7/1979 | Schwartz | 280/688 |
| 4,166,640 | 9/1979 | Van Denberg | 280/711 |
| 4,315,562 | 2/1982 | Tangorra et al. | 267/73 |
| 4,434,721 | 3/1984 | Shelton et al. | 267/73 |
| 5,037,126 | 8/1991 | Gottschalk et al. | 280/688 |

FOREIGN PATENT DOCUMENTS 61-77505  4/1986  Japan ................................. 280/688

OTHER PUBLICATIONS

Neway Air-Beam Drive Axle Air Suspension Brochure, Date Unknown (prior to filling date of the present invention.)

Primary Examiner—Charles A. Marmor
Assistant Examiner—Tamara L. Graysay
Attorney, Agent, or Firm—Thomas P. Liniak

[57] ABSTRACT

A flexible energy absorbing strap is provided to limit downward travel of a suspension system in reaction to rebound forces. The strap requires and uses connections already existing in the suspension system for attachment, and provides two flexible bands between the suspension beam and the vehicle frame.

9 Claims, 3 Drawing Sheets

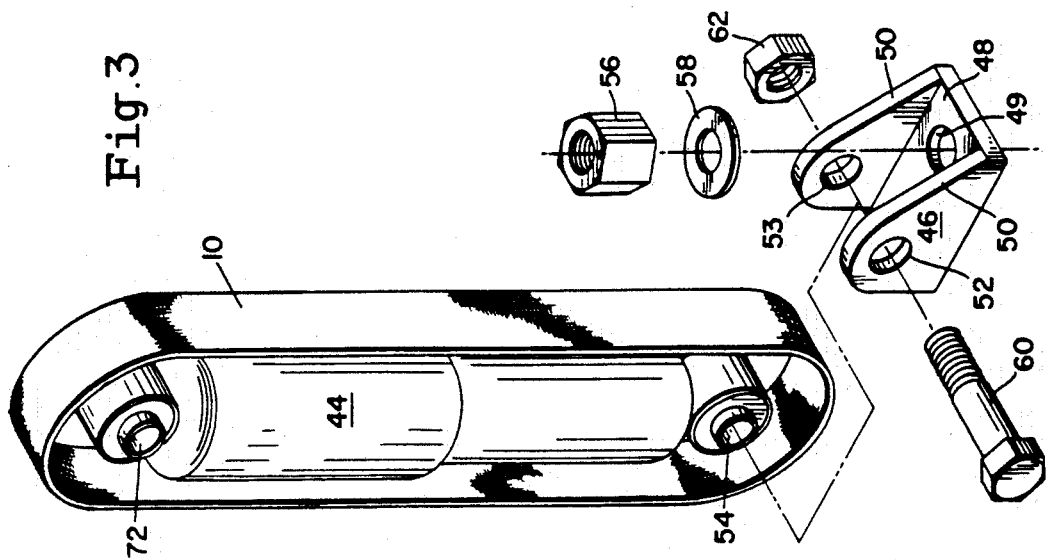
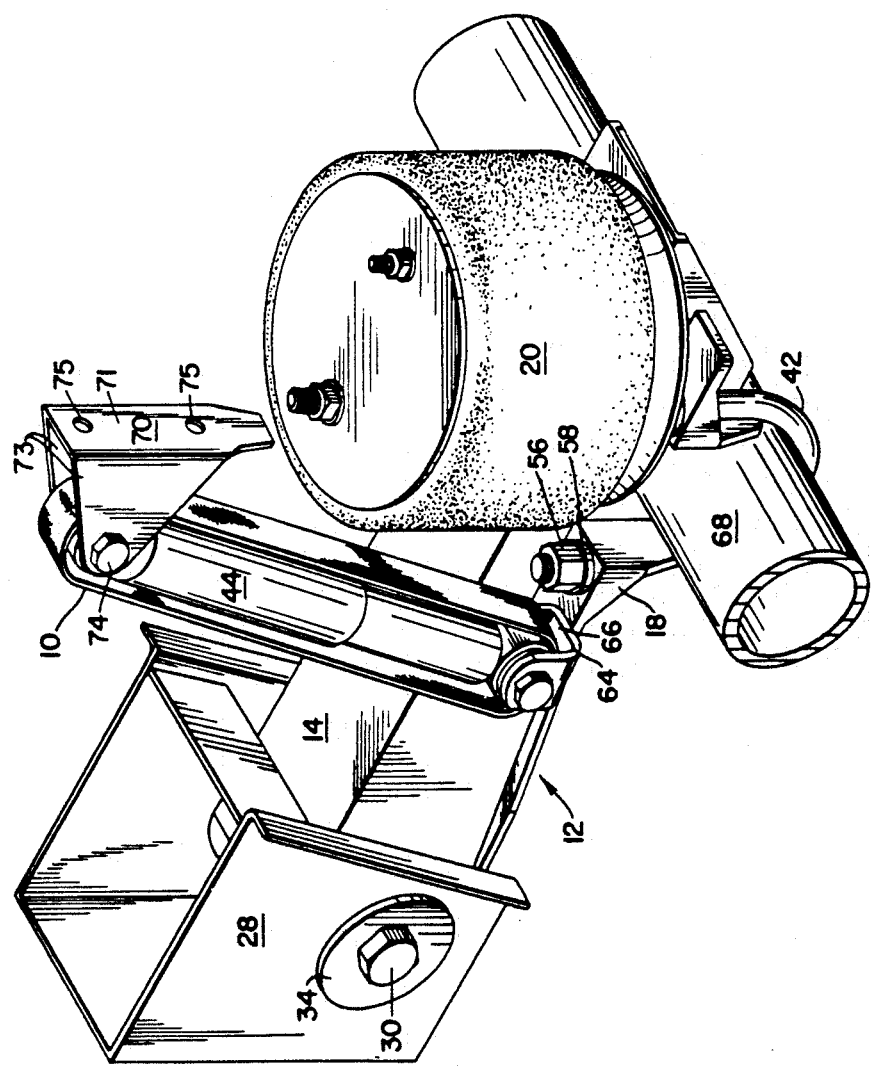

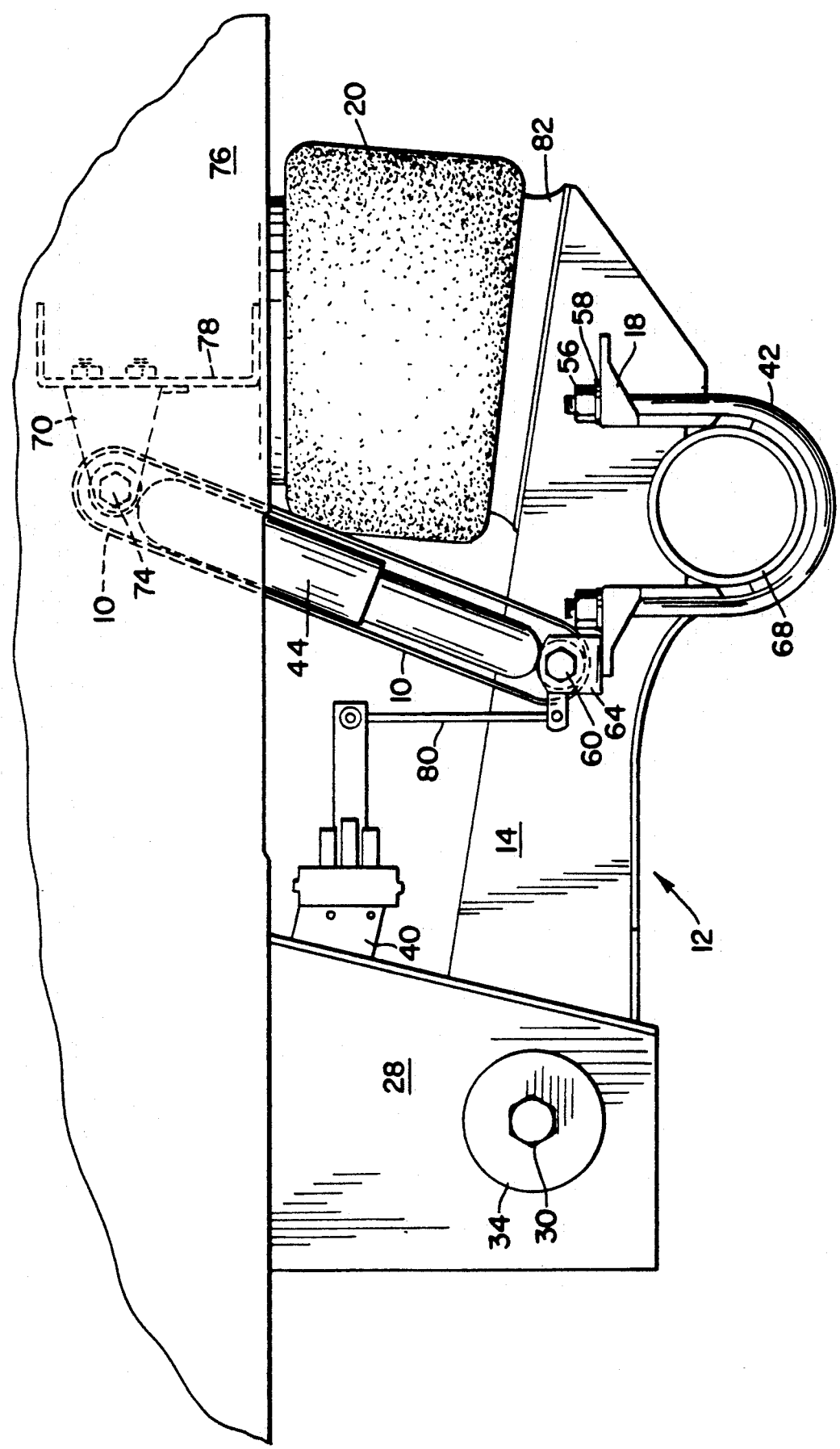

REBOUND STRAP

FIELD OF INVENTION

This invention relates to suspension systems for wheeled vehicles. More particularly, the present invention relates to an improved device for controlling and restricting travel of the suspension during use.

BACKGROUND OF THE INVENTION

All suspension systems for wheeled vehicles are designed to operate within a given range of travel or articulation. As a wheeled vehicle moves over a road or other surface, the wheels continually encounter irregularities in those surfaces that result in forces being transmitted to the vehicle suspension system. The vehicle's suspension system, therefore, must be able to articulate up and down in the vertical plane from its designed ride height, to accommodate irregularities in the road surface. Although it is important to allow this articulation of the suspension system, it is equally important to provide some type of positive restraint on the maximum amount of allowable travel in both upward and downward directions, to assure that suspension parameters are not exceeded, and thereby prevent any resultant damage to the suspension system components or the vehicle itself. Air spring damage may occur, for example, if the stroke of the suspension is not limited and the air spring is overextended. Limitation of downward travel of the suspension system is also particularly important in frameless dump vehicles and vehicles designed to carry materials such as coil steel, wherein a heavy load will be completely removed from the vehicle very quickly.

Travel of the suspension system in an upward direction has been most commonly restricted by a stop built into the air spring, usually referred to as a "bumper". Travel of the suspension system in a downward direction (also referred to as "rebound") has traditionally been restricted in a variety of different ways. The most common method utilizes a hydraulic down stop built into the shock absorbers of the suspension system. Although these systems have the benefit of being simple, they were also somewhat limited, with respect to their ability to restrict articulation of the suspension. In severe applications, the hydraulic stop may not be sufficient to handle the loads imposed on it.

In order to provide additional strength to resist axle travel and bottoming out of the shock absorber during rebound, the prior art moved to the use of supplementary devices added to the shock absorber or suspension system itself. External chains and/or cables have been connected between the vehicle chassis and the axle or suspension beam. These devices, however, also suffered from a number of drawbacks.

First, many of these devices, although structurally strong, were too rigid, and, therefore, did not act to absorb or dissipate the vertical forces encountered, but rather allowed translation of a great percentage of those forces into connecting elements and other components of the suspension system. Secondly, all of these "add-on" devices required additional fasteners, brackets, mountings or other connecting elements to be added to the suspension system. These additional elements added additional weight to the vehicle in multiples of two or more, depending upon the number of wheels of the vehicle. This reduced the amount of weight that could be carried by these vehicles under federal and state restrictions by the same amount, thereby reducing profitability of each vehicle trip. Thirdly, known energy-absorbing limiting devices were not constructed as endless loops, and, therefore, had potential weak points on the devices themselves, and also presented only a single flexible band connected between the frame and the suspension team or axle.

SUMMARY OF THE INVENTION

Accordingly, it is an object of the present invention to provide an energy-absorbing strap that restricts downward travel of a vehicle suspension system that does not require any additional fasteners or connecting means to be added to an existing suspension system.

Another object of the present invention is to provide an energy-absorbing strap, that while not requiring additional fasteners or connecting means, provides equal or greater resistance to downward or rebound forces in a vehicle suspension system than that of other known devices.

Yet another object of the present invention is to provide an energy-absorbing strap that can be used alone, or in conjunction with a shock absorber, to restrict downward travel of a vehicle suspension system.

These and other objects are satisfied, in accordance with the present invention, by providing in a vehicle suspension system having a beam, a beam-connecting means between the beam and the vehicle frame, and a continuous energy-absorbing band that restrains vertical movement of the suspension system and may also prevent bottoming-out of a shock absorber associated with the suspension suspension system 12 in FIGS. 1, 2 and 4. The structure and operation of the air suspension system illustrated in these drawings is fully described in the co-pending application, also owned by the assignee of the present application: Lightweight Beam Suspension System of Gottschalk et al., Ser. No. 578,780, filed Sep. 7, 1990, U.S. Pat. No. 5,037,126 which incorporates the preferred resilient bushing construction, which is described in detail in U.S. Pat. No. 4,166,640 to VanDenberg. If used together as illustrated, the benefits of all three of these inventions can be realized in a single suspension installation. It should be understood, however, as previously stated, that strap 10 of the present invention is not limited in any way in its application to use with this particular suspension system.

Referring specifically now to FIGS. 1, 2 and 4, strap 10 is illustrated in combination with suspension system 12, having beam 14 with resilient bushing 16 mounted therein at one end, and flanged member 18 extending along its sides in close proximity to its opposite end. The top of beam 14 is connected to air bag 20 using bolts 22 and washers 24. The top of air bag 20 is likewise rigidly connected to the frame of vehicle 76 by fastening elements 26. Apertured hanger bracket 28 system. Other objects will become apparent from the following description, with reference to the accompanying drawings.

BRIEF DESCRIPTION OF THE DRAWINGS

FIG. 1 is a perspective view of one embodiment of the present invention illustrated in conjunction with a vehicle suspension system.

FIG. 3 is an exploded perspective view of one embodiment of the present invention, in conjunction with a shock absorber and shock absorber connecting element.

FIG. 4 is a side plan of one embodiment of the present invention, illustrated in conjunction with a vehicle suspension system.

DETAILED DESCRIPTION OF THE INVENTION

Figure 2:
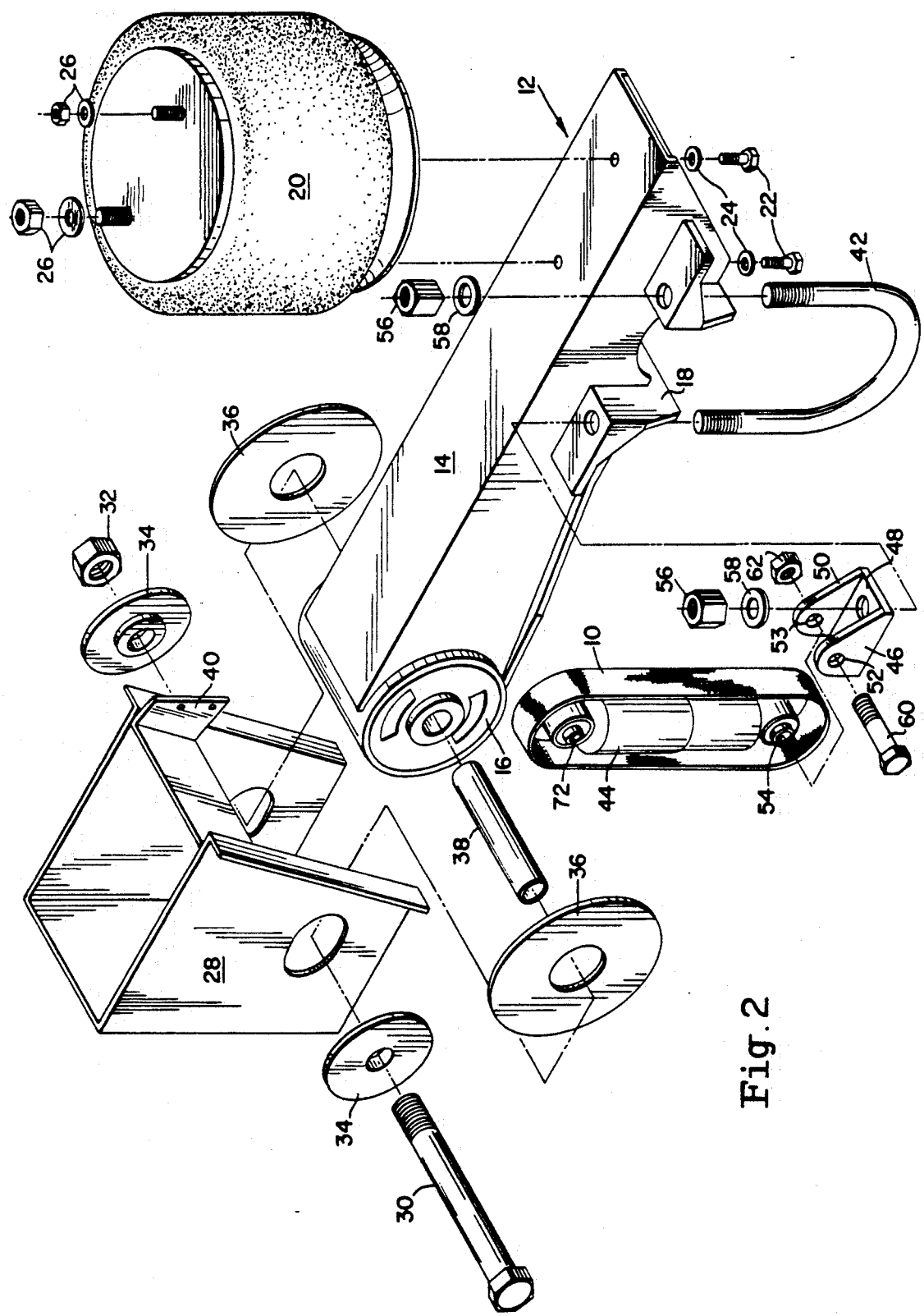
FIG. 2 is an exploded view of the embodiment of the present invention illustrated in FIG. 1, in conjunction with a different shock mounting bracket.

The present invention is designed to be used in conjunction with a vehicle suspension system. Strap 10 of the present invention can be utilized effectively in conjunction with most known mechanical and air suspension systems, to provide resistance against downward or rebound forces. The present invention is illustrated in conjunction with a particularly preferred lightweight air connects the opposite end of beam 14 to vehicle frame 76 by means of nut 30 and bolt 32, with bolt 32 passing through aligned outer washers 34, bracket 28, inner washers 36, and liner 38 within resilient bushing 16. Bracket 28 can alternatively be provided with mount 40 for a ride height adjustment mechanism 80, as illustrated in FIGS. 1 and 4.

An axle locus is formed by the combination of flange 18, beam 14 and U-shaped member 42 to position and retain axle 68. Suspension 12 is also provided with shock absorber 44. Shock absorber 44 absorbs energy to prevent suspension oscillation. As previously described, shock absorbers are used alone as rebound stops in some vehicle suspensions. Although many suspensions function satisfactorily without shock absorbers in some environments, an inadequate rebound stop can allow damage to occur to air spring 20 or other components of the suspension.

Shock absorber 44 is connected between beam 14 and vehicle frame or chassis cross-member by a variety of different devices. Two preferred bottom mounting brackets 46 (FIGS. 2 and 3) and 64 (FIGS. 1 and 4), for shock absorber 44 of suspension system 12, are illustrated. Both brackets 46 and 64, respectively, are known shock absorber mounting brackets with no additional structure added to accommodate strap 10. Bracket 46 has rectangular base 48 with hole 49 therein, and two sides 50 that project upwardly from base 48 and have aligned apertures 52, 53. Bracket 46 is rigidly attached to member 18 and, therefore, axle locus, by U-shaped member 42, nut 56 and washer 58. Hollow lower end 54 of shock absorber 44 is positioned between the two sides 50 of bracket 46, in alignment with apertures 52, 53 therein, with strap 10 encircling shock absorber 44, and with bottom of strap 10 located between bottom of shock absorber 44 and top of base 48. Shock absorber 44 is then secured in bracket 46 by passing bolt 60 through bracket apertures 52 and 53, and securing it with nut 62. This secures and restrains strap 10 in space between bottom 54 of shock absorber 44 and base 48 of bracket 46.

Moving now to FIG. 1 and 4, alternative bracket 64 for mounting shock absorber 44 and strap 10 is illustrated. Bracket 64 is structurally quite similar to previously described bracket 46. It differs only in that base 66 of bracket 64 does not have an aperture, and is welded to flanged member 18 at a slight distance from nut 56, rather than being attached to member 18 by U-shaped member 42 and nut 56. With bottom of shock absorber 44 secured in bracket 64, strap is also restrained and secured in position looped around shock absorber 44 in the space between bottom end 54 of shock absorber 44 and top surface of the base 66 of bracket 64. This demonstrates the flexibility of strap 10, in that it can be used and secured in position with most shock mounting brackets currently in use without any addition or modification thereto. Structurally, these brackets need only provide a space between bracket 64 and the bottom of shock absorber 44 to be capable of securing or restraining strap 10. In this manner, strap 10 does not require any additional fastening or securing means than already initially exist in the suspension system. This leads to an increase in the ability of shock absorber 44 and suspension system 12 to withstand downward or rebound forces, while, at the same time, not requiring any additional structural elements which would add weight and increase the complexity of the system.

Returning now to FIGS. 1 and 4, a preferred construction of upper bracket 70 is illustrated to secure hollow upper end 72 of shock absorber 44 and strap 10 that is looped around shock absorber 44 to a vehicle frame 76 or chassis member cross-member 78. Bracket 70 has base 71 having apertures 75 and two apertured, upwardly extended sides 73. To install shock absorber 44, strap 10 is initially looped around shock absorber 44, and strap 10 and shock absorber 44 are moved together between sides 73 of bracket 70 until hollow end 72 of shock absorber 44 is aligned with apertures in sides 73 of bracket 70. Shock absorber 44, and thereby strap 10, are then secured by use of bolt 74.

Similarly to previously described bottom brackets 46 and 64 for securing shock absorber 44, upper end of strap 10 is secured using existing shock bracket 70 and requires no additional fastening means. Again, bracket 70 (like brackets 46 and 64) is presented only to be exemplary of the preferred type of bracket that strap 10 can be utilized with. Strap 10 can be used in conjunction with virtually any type of shock absorber bracket that allows strap 10 to be looped around shock absorber 44 and be restrained in that position.

Strap 10 is constructed as a continuous seamless band for structural integrity. Strap 10 must have good energy absorption characteristics to resist downward force of rebound force. To provide proper energy absorption and wear characteristics, strap 10 is constructed of a resilient material. Given the rather harsh environment that strap 10 is exposed to, it is preferred to construct strap 10 of nylon, polyester or another woven polymer. In use, when mounted on suspension system 12, strap 10 is almost always relatively loosely looped around shock absorber 44, except when strong rebound or downward forces are encountered. Shock absorber 44 is under partial compression at rest, and can be further compressed or expanded in reaction to forces encountered. Strap 10 at rest is preferably on the order of about two inches longer than shock absorber 44. As a result, strap 10 does not act until suspension system 12 moves downward, away from frame 76, and shock absorber 44 is further extended from its initial resting position. As previously stated, strap 10 encircles shock absorber 44 and is restrained by the same fasteners that restrain shock absorber 44. In operation, when suspension system 12 encounters sufficient downward or rebound force, strap 10 becomes taut and acts to absorb energy and restrict downward travel before shock absorber 44 bottoms out. In this manner, axle travel is restricted and potential damage to air bag 20, or other components of suspension system 12, is prevented.

Although strap 10 can be constructed in a variety of different widths, depending upon the desired resistance to forces and materials selected, it has been found that strap widths in the range of one to two inches are preferred. It has also been found that straps 10 can be constructed of a material and size sufficient to withstand up to more than 15,000 pounds of force, with the most preferable constructions being able to withstand forces between 3,000 and 15,000 pounds. It should also be understood that the looped construction of strap 10 of the present invention allows a greater magnitude of force to be accommodated than existing devices. Construction of strap 10 presents two flexible bands (one on each side), along the entire length of shock absorber 44, to absorb and counteract rebound forces. Since these forces are acted upon by two bands of strap 10, rather than just one as in prior art devices, each band need only react one-half of the total rebound force, thereby increasing strength and longevity of strap 10 and suspension system 12.

It should also be understood that, although discussed here in conjunction with a shock absorber, strap 10 could be used as a rebound stop in a suspension system that does not contain a shock absorber, by mounting strap 10 around existing shock brackets and their fasteners, or using other fastening elements on the beam or axle mount and the frame to secure strap 10. In this manner, strap 10 is used alone as the rebound stop for suspension system 12. Suspension system 12 gains the benefit of the looped endless construction of strap 10 (presenting two bands of flexible resilient material between the frame and the beam to absorb and counteract rebound forces), while eliminating the weight of shock absorber 44. With reference to FIGS. 1-3, strap 10 used in this configuration would be wrapped around, and, therefore, encircle, bolts 74 and 60 to provide a resilient connection between frame 76 and beam 14.

Once given the above disclosure, many other features, modifications and improvements will become apparent to the skilled artisan. Such features, modifications and improvements are, therefore, considered to be a part of this invention, the scope of which is to be determined by the following claims.

I claim:

1. In an axle suspension system for a vehicle having a frame, comprising an elongated substantially rigid beam, air spring means located at one end of the beam a hanger bracket located at the other end of the beam, means for pivotally connecting the hanger bracket to the beam, means for connecting an axle to the beam located intermediate the ends of the beam, shock absorbing means, and means for connecting the shock absorbing means between the beam and the vehicle frame, the improvement comprising endless resilient means for limiting downward movement of the suspension system that encircles the shock-absorbing means and is restrained by the means for connecting said shock absorbing means.

2. The suspension system of claim 1, wherein said resilient means is constructed of a woven polymer.

3. The suspension system of claim 2, wherein said woven polymer is nylon.

4. In an axle suspension system for a vehicle having a frame, comprising an elongated substantially rigid beam, a hanger bracket located at the one end of the beam, means for pivotally connecting the hanger bracket to the beam, means for connecting an axle to the beam located intermediate the ends of the beam, shock absorbing means, and means for connecting the shock absorbing means between the beam and the vehicle frame, the improvement comprising endless resilient means for limiting downward movement of the suspension system that encircles the shock absorbing means and is restrained by the means for connecting said shock-absorbing means.

5. The suspension system of claim 4, wherein said resilient means is constructed of a woven polymer.

6. The suspension system of claim 5, wherein said woven polymer is nylon.

7. In an axle suspension system for a vehicle having a frame, comprising an elongated substantially rigid beam, a hanger bracket located at the other end of the beam, means for pivotally connecting the hanger bracket to the beam, means for connecting an axle to the beam located intermediate the ends of the beam, and means for connecting a shock absorbing means between the beam and the vehicle frame, the improvement comprising endless resilient means for limiting downward movement of the suspension system that encircles and is restrained by a portion of the means for connecting the shock-absorbing means, said limiting means further comprising a plurality of bands between said vehicle frame and said beam.

8. The suspension system of claim 7, wherein said resilient means is constructed of a woven polymer.

9. The suspension system of claim 8, wherein said woven polymer is nylon.

* * * * *